(12) United States Patent
Furusawa (10) Patent No.: US 11,364,748 B2
(45) Date of Patent: Jun. 21, 2022

(54) PNEUMATIC TIRE

(71) Applicant: The Yokohama Rubber Co., LTD., Tokyo (JP)

(72) Inventor: Hiroshi Furusawa, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 245 days.

(21) Appl. No.: 16/487,818

(22) PCT Filed: Dec. 27, 2017

(86) PCT No.: PCT/JP2017/047128
§ 371 (c)(1),
(2) Date: Aug. 21, 2019

(87) PCT Pub. No.: WO2018/154968
PCT Pub. Date: Aug. 30, 2018

(65) Prior Publication Data
US 2021/0129594 A1 May 6, 2021

(30) Foreign Application Priority Data
Feb. 22, 2017 (JP) .............................. JP2017-030887

(51) Int. Cl.
*B60C 11/13* (2006.01)
*B60C 11/03* (2006.01)

(52) U.S. Cl.
CPC ... *B60C 11/1392* (2013.01); *B60C 2011/0365* (2013.01); *B60C 2011/0381* (2013.01); *B60C 2011/0395* (2013.01)

(58) Field of Classification Search
CPC ......... B60C 11/1392; B60C 2011/0365; B60C 2011/0381; B60C 2011/0395
See application file for complete search history.

(56) References Cited

U.S. PATENT DOCUMENTS 6,347,653 B1 * 2/2002 Kobayashi .......... B60C 11/0309
152/209.1
2007/0000590 A1 * 1/2007 Murata ................... B60C 11/13
152/209.8

(Continued)

FOREIGN PATENT DOCUMENTS

JP    2001180227 A  *  7/2001  ......... B60C 11/1384
JP       4217266         1/2009

(Continued)

OTHER PUBLICATIONS

Behr, WO-2012010342-A1 Machine Translation (Year: 2012).*

(Continued)

*Primary Examiner* — Robert C Dye
(74) *Attorney, Agent, or Firm* — Thorpe North & Western (57) ABSTRACT

A pneumatic tire includes lug grooves in a tread surface of a shoulder land, the lug grooves crossing a circumferential direction and terminating at a first side within the shoulder land and passing through a contact edge at a second side; and a notch formed on an opening edge of the lug grooves, the notch being cutout from the tread surface cut radially inward. The lug grooves have a width decreasing from the first to the second side, an end position of the lug grooves is disposed from a main groove from 5% to 35% of a lateral dimension from the main groove to the ground contact edge, and a maximum groove width position is disposed from the main groove 40% or less of the lateral dimension from the main groove to the ground contact edge; and the notch has a width that increases from the first to the second side.

11 Claims, 8 Drawing Sheets

(56) References Cited

U.S. PATENT DOCUMENTS

| | | | |
|---|---|---|---|
| 2008/0041509 A1* | 2/2008 | Shimizu | B60C 11/0311 |
| | | | 152/209.16 |
| 2010/0200134 A1 | 8/2010 | Murata | |
| 2010/0326577 A1 | 12/2010 | Iwai | |
| 2013/0292018 A1 | 11/2013 | Murata | |
| 2016/0101655 A1 | 4/2016 | Shibayama | |
| 2016/0152090 A1* | 6/2016 | Takemoto | B60C 11/0306 |
| | | | 152/209.24 |
| 2017/0001479 A1* | 1/2017 | Takahashi | B60C 11/1392 |

FOREIGN PATENT DOCUMENTS

| | | | |
|---|---|---|---|
| JP | 2009-067244 | 4/2009 | |
| JP | 2016-078475 | 5/2016 | |
| JP | 2016-141157 | 8/2016 | |
| JP | 2016-168911 | 9/2016 | |
| JP | 2016-175576 | 10/2016 | |
| WO | WO 2009/020077 | 2/2009 | |
| WO | WO 2009/034791 | 3/2009 | |
| WO | WO-2012010342 A1 * | 1/2012 | B60C 11/0306 |

OTHER PUBLICATIONS

Tsuda, JP-2001180227-A Machine Translation (Year: 2001).*
International Search Report for International Application No. PCT/JP2017/047128 dated Apr. 10, 2018, 3 pages, Japan.

* cited by examiner

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|---|
| LUG GROOVE TERMINATES IN SHOULDER LAND PORTION | YES | YES | YES | YES | YES | YES | YES | YES | YES |
| LUG GROOVE TERMINATING END POSITION: PROPORTION OF TIRE LATERAL DIRECTION DIMENSION W OF SHOULDER LAND PORTION (%) | 35 | 35 | 35 | 35 | 35 | 35 | 35 | 35 | 35 |
| LUG GROOVE MAXIMUM WIDTH POSITION: PROPORTION OF TIRE LATERAL DIRECTION DIMENSION W OF SHOULDER LAND PORTION (%) | 40 | 40 | 40 | 40 | 40 | 40 | 40 | 40 | 40 |
| NOTCH PORTION | YES | YES | YES | YES | YES | YES | YES | YES | YES |
| NOTCH DEPTH OF NOTCH PORTION (mm) | 2.0 | 2.0 | 2.0 | 2.0 | 2.0 | 2.0 | 0.5 | 3.0 | 2.0 |
| LUG GROOVE MAXIMUM GROOVE WIDTH POSITION — GROOVE WIDTH OF LUG GROOVE (mm) | 4.0 | 4.0 | 4.0 | 4.0 | 4.0 | 4.0 | 4.0 | 4.0 | 4.0 |
| LUG GROOVE MAXIMUM GROOVE WIDTH POSITION — NOTCH WIDTH OF NOTCH PORTION (mm): LEADING/TRAILING | 0.5/0.5 | 0.5/0.5 | 0.5/0.5 | 0.5/0.5 | 0.5/0.5 | 0.5/0.5 | 0.5/0.5 | 0.5/0.5 | 0.5/0.5 |
| 0.50 L — GROOVE WIDTH OF LUG GROOVE (mm) | 4.0 | 4.5 | 3.5 | 3.5 | 3.5 | 3.8 | 3.5 | 3.5 | 3.5 |
| 0.50 L — NOTCH WIDTH OF NOTCH PORTION (mm): LEADING/TRAILING | 0.5/0.5 | 0.5/0.5 | 0.9/0.9 | 0.8/0.8 | 0.6/0.1 | 0.6/0.8 | 0.8/0.8 | 0.8/0.8 | 0.8/0.8 |
| 0.80 L — GROOVE WIDTH OF LUG GROOVE (mm) | 4.0 | 4.8 | 3.2 | 3.2 | 3.2 | 3.6 | 3.2 | 3.2 | 3.2 |
| 0.80 L — NOTCH WIDTH OF NOTCH PORTION (mm): LEADING/TRAILING | 0.5/0.5 | 0.5/0.5 | 1.3/1.3 | 1.0/1.0 | 0.7/1.3 | 0.7/1.0 | 1.0/1.0 | 1.0/1.0 | 1.0/1.0 |
| 1.00 L — GROOVE WIDTH OF LUG GROOVE (mm) | 4.0 | 5.0 | 3.0 | 3.0 | 3.0 | 2.0 | 3.0 | 3.0 | 3.0 |
| 1.00 L — NOTCH WIDTH OF NOTCH PORTION (mm): LEADING/TRAILING | 0.5/0.5 | 0.5/0.5 | 1.5/1.5 | 1.1/1.1 | 0.8/1.4 | 1.4/2.0 | 1.1/1.1 | 1.1/1.1 | 1.1/1.1 |
| POSITION OF CONFIGURATION WHEN TIRE IS MOUNTED ON A VEHICLE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE INNER SIDE |
| QUIETNESS PERFORMANCE | 100 | 95 | 103 | 105 | 107 | 110 | 107 | 104 | 102 |
| WET PERFORMANCE | 100 | 105 | 106 | 105 | 108 | 112 | 104 | 107 | 106 |

PNEUMATIC TIRE

TECHNICAL FIELD

The present technology relates to a pneumatic tire.

BACKGROUND ART

A known pneumatic tire, for example, the pneumatic tire described in Japan Patent No. 4217266, has an object of achieving dry grip properties and wet performance in a compatible manner to a high degree, increasing uneven wear resistance, and improving the running stability when running near maximum speed. This pneumatic tire includes one longitudinal main groove disposed in a vehicle outer side region of a tread surface, and two longitudinal main grooves disposed in a vehicle inner side region. A central region between the longitudinal main groove in the outer side region and the longitudinal main grooves in the inner side region is formed as a rib. A shoulder region between the longitudinal main groove in the outer side region and the ground contact edge in the outer side region includes inclined main grooves traversing the shoulder region and is formed as a block row. The blocks include inclined lug grooves that traverse between the inclined main grooves and have a different inclination from the inclined main grooves, the inclined lug grooves defining the blocks into a tire equator side and a ground contact edge side. Additionally, in the pneumatic tire, the inclined main grooves include a chamfer-like notch portion on the ground contact edge side, and the width of the notch portion gradually increases toward the ground contact edge.

In the pneumatic tire described in Japan Patent No. 4217266, the inclined main grooves are formed traversing between the longitudinal main groove in the outer side region and the ground contact edge in the outer side region, and the longitudinal main groove in the outer side region and the ground contact edge in the outer side region communicate via the inclined main grooves. As a result, noise escapes from the longitudinal main groove in the outer side region to the ground contact edge in the outer side region, and pattern noise is generated. As a technique for reducing pattern noise, the groove width of the lug grooves could be narrowed toward the ground contact edge, but this would make it difficult to ensure wet performance (braking performance on wet road surfaces) due to the resulting reduced drainage performance.

SUMMARY

The present technology provides a pneumatic tire that can provide reduced pattern noise while ensuring wet performance.

A pneumatic tire according to an aspect of the present technology, comprises:

in a tread surface of a shoulder portion, a main groove extending in a tire circumferential direction;

a shoulder land portion defined by an outermost side in a tire lateral direction of the main groove;

lug grooves arranged in the tire circumferential direction in the tread surface of the shoulder land portion, the lug grooves each crossing the tire circumferential direction and terminating at a first end side within the shoulder land portion and passing through a ground contact edge at a second end side; and a notch portion formed on an opening edge of the lug grooves, the notch portions being a cutout from the tread surface cut inward in a tire radial direction; wherein the lug grooves have a groove width that decreases from the first end side to the second end side, a terminating end position of the lug grooves is disposed in a range from the main groove that is from 5% to 35% of a tire lateral direction dimension from the main groove to the ground contact edge, and a maximum groove width position is disposed in a range from the main groove that is 40% or less of the tire lateral direction dimension from the main groove to the ground contact edge; and the notch portion has a notch width that increases from the first end side to the second end side of the lug grooves.

According to the pneumatic tire, the lug groove terminates within the shoulder land portions and is closed. Thus, the noise propagating from the main groove located outermost in the tire lateral direction is prevented from emitting outward in the tire lateral direction through the lug groove, and the rigidity of the tread portion at the shoulder land portion is increased, allowing for a deterioration in steering stability performance and wear resistance performance to be prevented. Moreover, the lug groove of the shoulder land portion has the groove width that gradually decreases toward the ground contact edge. This allows the noise emitting outward from the lug groove in the tire lateral direction to be suppressed. Moreover, the notch portion provided on the opening edge of the lug groove of the shoulder land portion has the notch width that gradually increases toward the ground contact edge. This allows the drainage performance in the lug groove to be increased. As a result, pattern noise can be decreased while maintaining wet performance (braking performance on wet road surfaces).

In a pneumatic tire according to an aspect of the present technology, preferably relationships $0 \leq x0 < x$ and $0.2(y0-y)+x0 \leq x \leq 2.0(y0-y)+x0$ are satisfied, where $y0$ is a maximum groove width of the lug grooves, $x0$ is the notch width of the notch portion at the maximum groove width position of the lug grooves, $y$ is a groove width of the lug grooves at a discretionary position located further outward in the tire lateral direction than the maximum groove width position of the lug grooves, and $x$ is a notch width of the notch portion at a discretionary position.

According to the pneumatic tire, the notch width $x$ of the notch portion is set in accordance with the change in the groove width $y$ of the lug groove of the shoulder land portion, and when the notch width $x$ of the notch portion is $0.2(y0-y)+x0$ or greater, a significant effect of improving drainage performance can be obtained. When the notch width $x$ of the notch portion is $2.0(y0-y)+x0$ or less, the effect of suppressing noise emitting outward in the tire lateral direction from the lug groove can be significantly obtained. As a result, pattern noise can be reduced and an effect of ensuring wet performance (braking performance on wet road surfaces) can be significantly obtained.

In a pneumatic tire according to an aspect of the present technology, preferably the notch portion has a notch depth from the tread surface inward in the tire radial direction of from 0.5 mm to 3.0 mm.

According to this pneumatic tire, by the notch depth of the notch portion being 0.5 mm or greater, the effect of ensuring drainage performance can be significantly obtained. Also, with the notch depth of the notch portion being 3.0 mm or less, the effect of suppressing noise emission can be significantly obtained.

In a pneumatic tire according to an aspect of the present technology, preferably a rotation direction is designated; and a relationship $xb < xa \le 3.0xb$ is satisfied, where xa is a notch width of the notch portion located on a trailing side of the shoulder land portion in the tire circumferential direction with respect to the lug grooves, and xb is a notch width of the notch portion located on a leading side.

According to the pneumatic tire, with the notch width of the notch portion on the trailing side of the shoulder land portion in the tire circumferential direction with respect to the lug groove being greater than the notch width of the notch portion on the leading side allows deformation (twisting) on the trailing side to be suppressed and rigidity ensured more than on the leading side with respect to the lug groove. As a result, heal and toe wear can be suppressed and wear resistance performance can be improved.

In a pneumatic tire according to an aspect of the present technology, preferably the notch portion has a constant notch width in a range from the maximum groove width position of the lug grooves to the terminating end position.

According to the pneumatic tire, an amount of water taken in by the notch portion is ensured in the range from the position of the maximum groove width of the lug groove of the shoulder land portion to the terminating position. Moreover, when the notch portion is formed widening greatly toward the main groove located outermost in the tire lateral direction, the ground contact region decreases at this portion and the ground contact pressure increases. As a result, wear resistance performance tends to decrease. According to the pneumatic tire, this can be improved.

In a pneumatic tire according to an aspect of the present technology, preferably a vehicle inner/outer side orientation when mounted on a vehicle is designated; and the shoulder land portion provided with the lug grooves and the notch portion is disposed at least on a vehicle outer side.

The vehicle outer side, when the tire is mounted on a vehicle, has significant problems with noise emission. Thus, according to the pneumatic tire, by disposing the shoulder land portion provided with the lug grooves and the notch portions on the vehicle outer side, noise emission can be effectively suppressed and significant effect can be obtained.

In a pneumatic tire according to an aspect of the present technology, preferably at a position $0.50 \times L$ from an inner side in the tire lateral direction, a relationship $0.80 \times y0 \le y \le 0.98 \times y0$ is satisfied;

at a position $0.80 \times L$ from the inner side in the tire lateral direction, a relationship $0.60 \times y0 \le y \le 0.90 \times y0$ is satisfied; and at a position $1.00 \times L$ from the inner side in the tire lateral direction, a relationship $0.30 \times y0 \le y \le 0.50 \times y0$ is satisfied, where L is a tire lateral direction dimension from the maximum groove width position of the lug grooves to the ground contact edge, y0 is a maximum groove width of the lug grooves, and y is a groove width of the lug grooves at a discretionary position located further outward in the tire lateral direction than the maximum groove width position of the lug grooves.

According to the pneumatic tire, with the groove width y of the lug groove at or near the ground contact edge being narrow, groove volume can be ensured, wet performance can be maintained, and an effect of reducing pattern noise can be significantly obtained.

A pneumatic tire according to an embodiment of the present technology can provide reduced pattern noise and maintain wet performance.

BRIEF DESCRIPTION OF DRAWINGS

FIG. 8 is a table showing the results of performance tests of pneumatic tires according to examples of the present technology.

DETAILED DESCRIPTION

Embodiments of the present technology are described in detail below with reference to the drawings. However, the present technology is not limited by the embodiment. Constituents of the embodiment include elements that are essentially identical or that can be substituted or easily conceived by one skilled in the art. Furthermore, the modified examples described in the embodiment can be combined as desired within the scope apparent to one skilled in the art.

Figure 1:
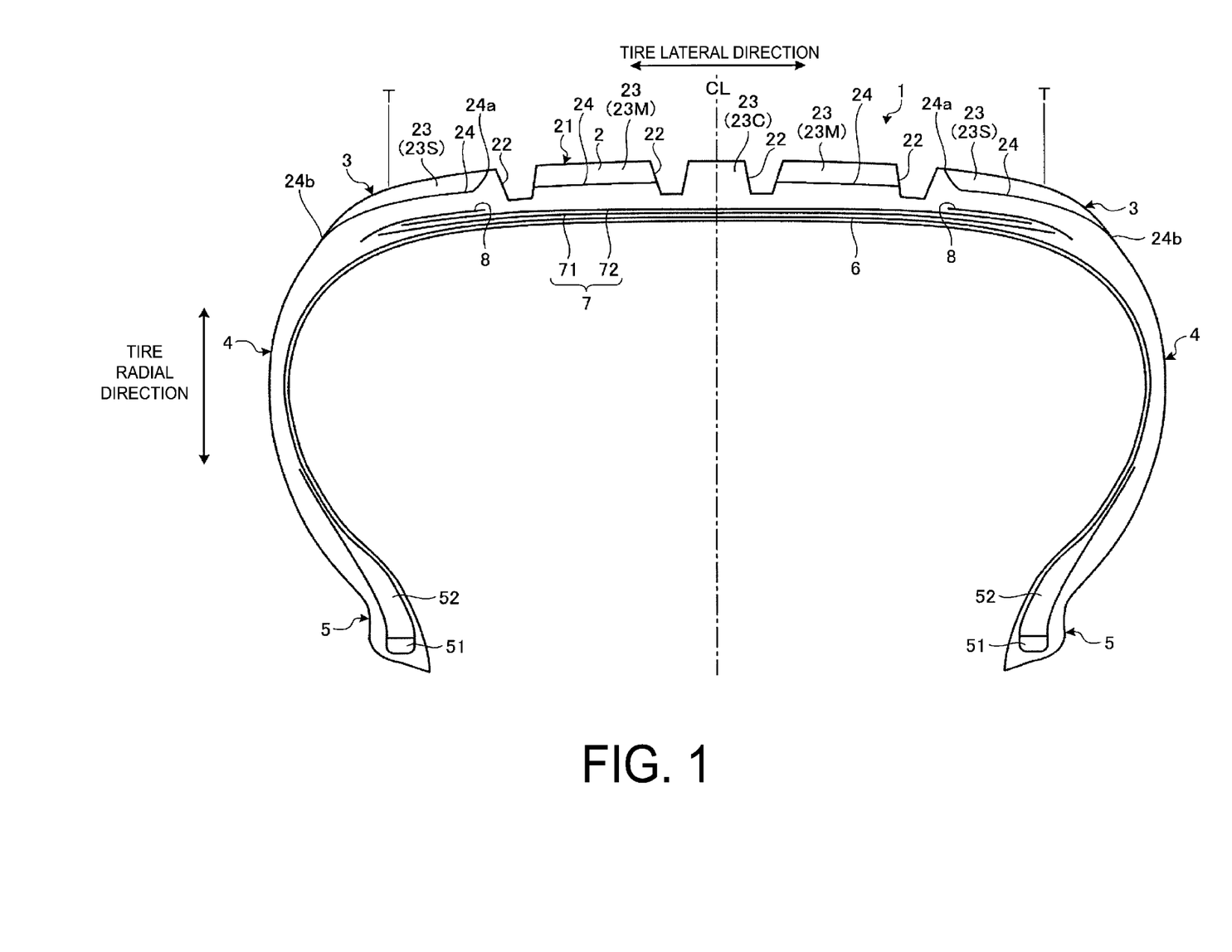
FIG. 1 is a meridian cross-sectional view of a pneumatic tire according to an embodiment of the present technology.

A pneumatic tire according to the present embodiment will be described. FIG. 1 is a meridian cross-sectional view of a pneumatic tire according to the present embodiment.

Herein, "tire radial direction" refers to the direction orthogonal to the rotation axis (not illustrated) of a pneumatic tire 1. "Inward in the tire radial direction" refers to the direction toward the rotation axis in the tire radial direction. "Outward in the tire radial direction" refers to the direction away from the rotation axis in the tire radial direction. "Tire circumferential direction" refers to a circumferential direction with the rotation axis as a center axis. Additionally, "tire lateral direction" refers to a direction parallel with the rotation axis P. "Inward in the tire lateral direction" refers to a direction toward a tire equatorial plane (tire equator line) CL in the tire lateral direction. "Outward in the tire lateral direction" refers to a direction away from the tire equatorial plane CL in the tire lateral direction. "Tire equatorial plane CL" refers to the plane orthogonal to the rotation axis of the pneumatic tire 1 that passes through the center of the tire width of the pneumatic tire 1. "Tire width" is the width in the tire lateral direction between components located outward in the tire lateral direction, or in other words, the distance between the components that are the most distant from the tire equatorial plane CL in the tire lateral direction. "Tire equator line" refers to the line in the tire circumferential direction of the pneumatic tire 1 that lies on the tire equatorial plane CL. In the present embodiment, the tire equator line and the tire equatorial plane are denoted by the same reference sign CL.

As illustrated in FIG. 1, the pneumatic tire 1 of the present embodiment includes a tread portion 2, shoulder portions 3 on opposite sides of the tread portion 2, and sidewall portions 4 and bead portions 5 sequentially continues from the shoulder portions 3. Additionally, the pneumatic tire 1 includes a carcass layer 6, a belt layer 7, and a belt reinforcing layer 8. The pneumatic tire 1 according to the present embodiment is mainly used for passenger vehicles but may also be a heavy duty pneumatic tire for trucks and buses.

The tread portion 2 is made of a rubber material (tread rubber) and is exposed on the outermost side of the pneumatic tire 1 in the tire radial direction, with the surface thereof constituting the profile of the pneumatic tire 1. A tread surface 21 is formed on an outer circumferential surface of the tread portion 2, in other words, on a road contact surface that comes into contact with a road surface when running. A plurality (four in the present embodiment) of main grooves 22 extending in the tire circumferential direction are disposed side by side in the tire lateral direction in the tread surface 21. Moreover, a plurality (five in the present embodiment) of rib-like land portions 23 extending in the tire circumferential direction and parallel with the tire equator line CL are defined in the tread surface 21 by the plurality of main grooves 22. Specifically, in the pneumatic tire 1 of the present embodiment, the land portions 23 include shoulder land portions 23S located outermost in the tire lateral direction, a center land portion 23C centrally located in the tire lateral direction, and middle land portions 23M located between the shoulder land portions 23S and the center land portion 23C in the tire lateral direction. A plurality of lug grooves 24 extending in the tire circumferential direction and crossing the tire circumferential direction (main grooves 22) are disposed in the tire circumferential direction in the tread surface 21 of the land portions 23. Note that in an embodiment with five or more main grooves 22, a plurality of middle land portions 23M are defined on either side of the tire equatorial plane CL in the tire lateral direction.

The shoulder portions 3 are portions of the tread portion 2 located outward in the tire lateral direction on both sides. Additionally, the sidewall portions 4 are exposed on the outermost sides of the pneumatic tire 1 in the tire lateral direction. The bead portions 5 each include a bead core 51 and a bead filler 52. The bead core 51 is formed by winding a bead wire, which is a steel wire, into an annular shape. The bead filler 52 is a rubber material that is disposed in the space formed by an end portion of the carcass layer 6 in the tire lateral direction being folded back at the position of the bead core 51.

The end portions of the carcass layer 6 in the tire lateral direction are folded back around the pair of bead cores 51 from inward to outward in the tire lateral direction, and the carcass layer 6 is stretched in a toroidal shape in the tire circumferential direction to form the framework of the tire. The carcass layer 6 is made of coating rubber-covered carcass cords (not illustrated) disposed side by side with an angle with respect to the tire circumferential direction along the tire meridian direction at an angle with respect to the tire circumferential direction. The carcass cords are made of organic fibers (e.g., polyester, rayon, nylon, and the like). The carcass layer 6 is provided with at least one layer.

The belt layer 7 has a multilayer structure in which at least two belts 71, 72 are layered. In the tread portion 2, the belt layer 7 is disposed outward of the carcass layer 6 in the tire radial direction, i.e., on the outer circumference thereof, and covers the carcass layer 6 in the tire circumferential direction. The belts 71, 72 are made of coating rubber-covered cords (not illustrated) disposed side by side at a predetermined angle with respect to the tire circumferential direction (for example, from 20 degrees to 30 degrees). The cords are made of steel or organic fibers (polyester, rayon, nylon, or the like). Moreover, the belts 71, 72 overlap each other and are disposed so that the direction of the cords of the respective belts intersect each other.

The belt reinforcing layer 8 is disposed outward of the belt layer 7 in the tire radial direction, i.e., on the outer circumference thereof, and covers the belt layer 7 in the tire circumferential direction. The belt reinforcing layer 8 is made of coating rubber-covered cords (not illustrated) disposed side by side in the tire lateral direction substantially parallel (±5 degrees) with the tire circumferential direction. The cords are made of steel or organic fibers (polyester, rayon, nylon, or the like). The belt reinforcing layer 8 illustrated in FIG. 1 is disposed so as to cover end portions of the belt layer 7 in the tire lateral direction. The configuration of the belt reinforcing layer 8 is not limited to that described above. Although not illustrated in the drawings, a configuration may be used in which the belt reinforcing layer 8 is disposed so as to cover the entire belt layer 7. Alternatively, for example, a configuration with two reinforcing layers may be used, in which the inner reinforcing layer in the tire radial direction is formed larger than the belt layer 7 in the tire lateral direction so as to cover the entire belt layer 7, and the outer reinforcing layer in the tire radial direction is disposed so as to only cover the end portions of the belt layer 7 in the tire lateral direction. Alternatively, a configuration with two reinforcing layers may be used, in which both of the reinforcing layers are disposed so as to only cover the end portions of the belt layer 7 in the tire lateral direction. In other words, the belt reinforcing layer 8 overlaps with at least the end portion of the belt layer 7 in the tire lateral direction. Additionally, the belt reinforcing layer 8 is configured by winding a band-like (e.g., with a width of 10 mm) strip material in the tire circumferential direction.

Figure 2:
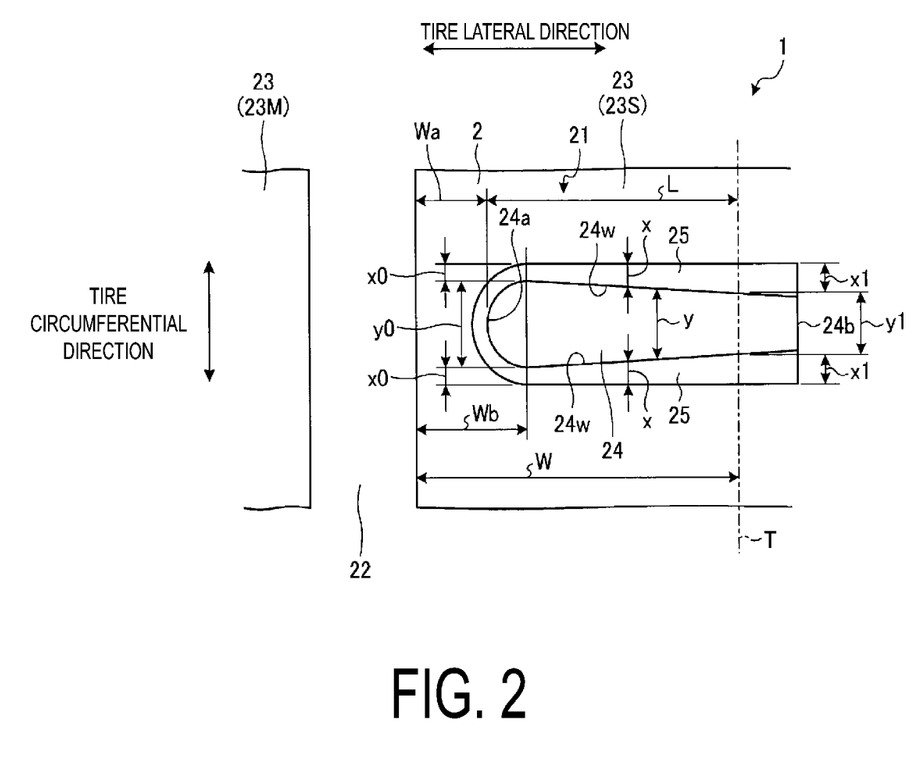
FIG. 2 is an enlarged plan view of a portion of a pneumatic tire according to an embodiment of the present technology.
Figure 3:
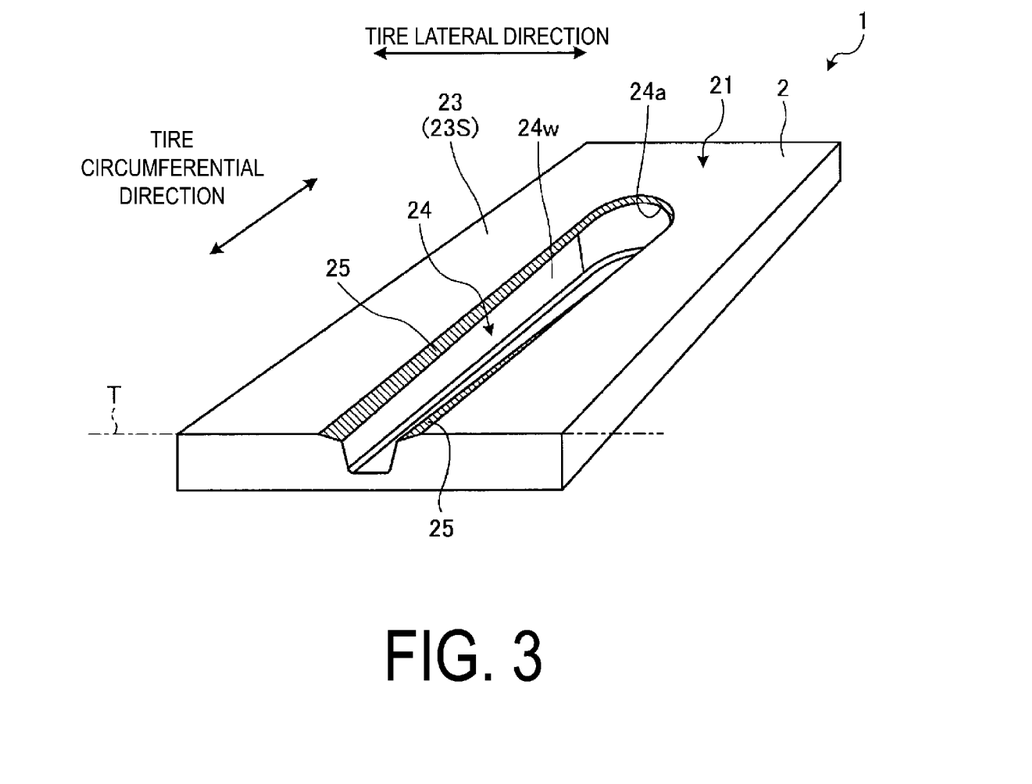
FIG. 3 is an enlarged perspective view of a portion of a pneumatic tire according to an embodiment of the present technology.
Figure 4:
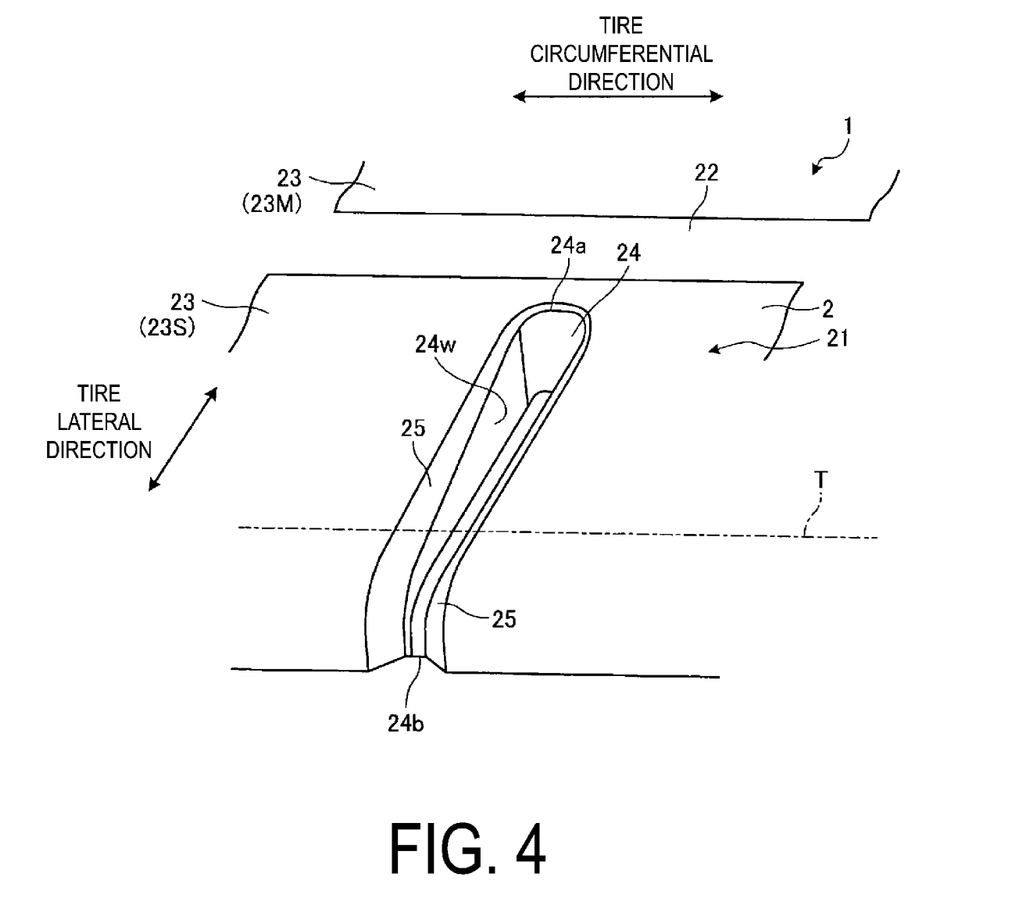
FIG. 4 is an enlarged perspective view of a portion of a pneumatic tire according to an embodiment of the present technology.
Figure 5:
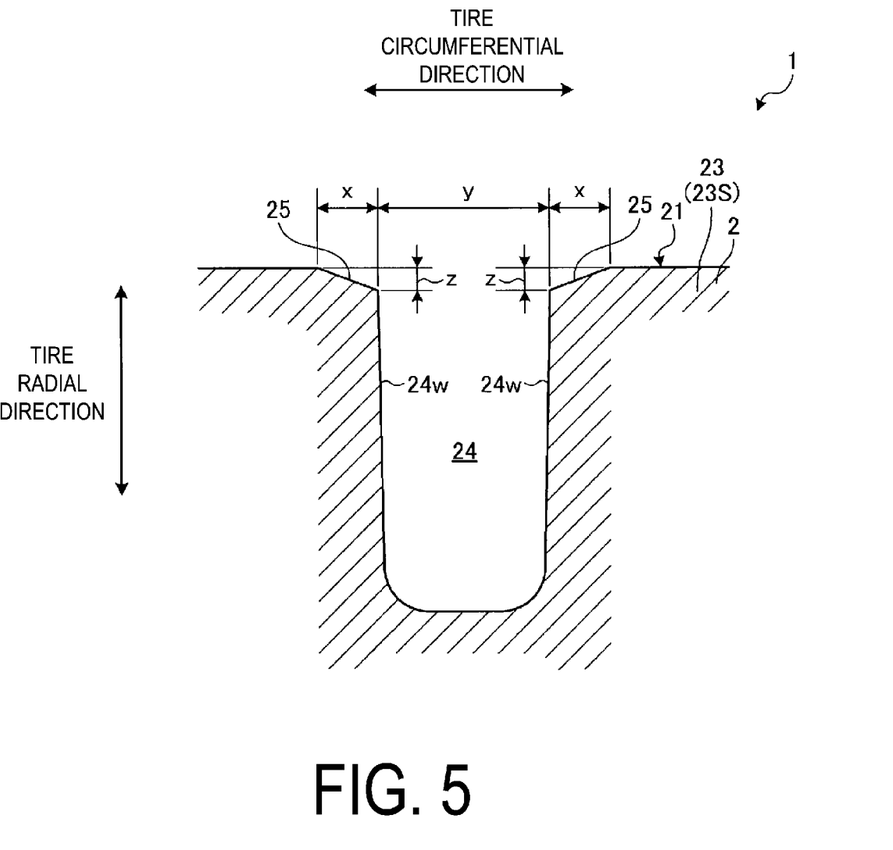
FIG. 5 is an enlarged cross-sectional view of a portion of a pneumatic tire according to an embodiment of the present technology.
Figure 6:
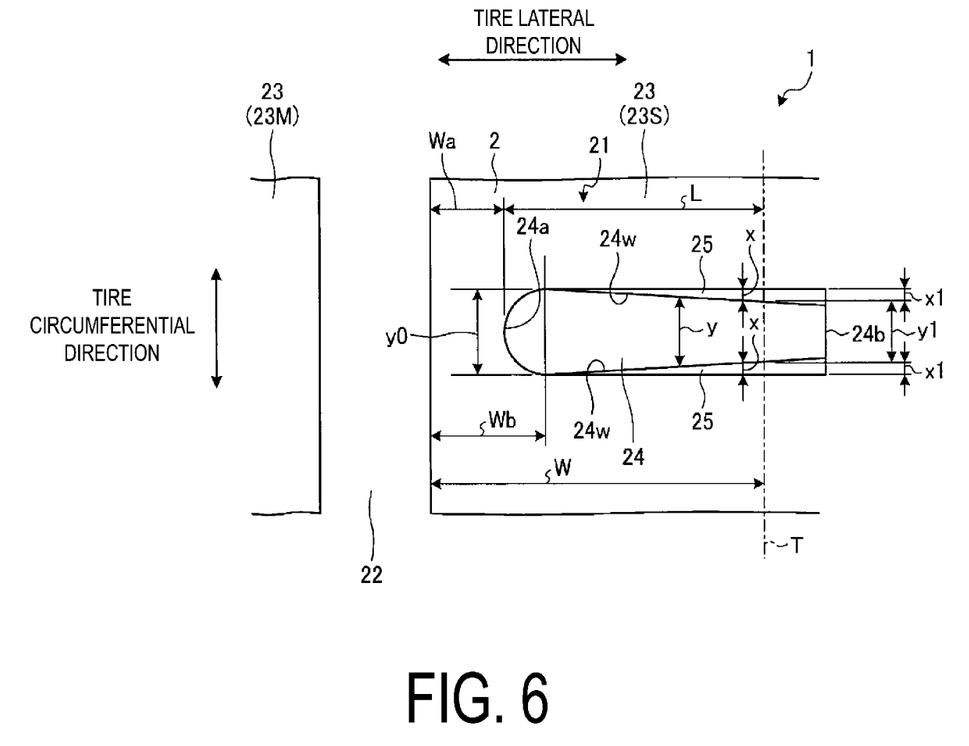
FIG. 6 is an enlarged plan view of a portion of a pneumatic tire according to another embodiment of the present technology.
Figure 7:
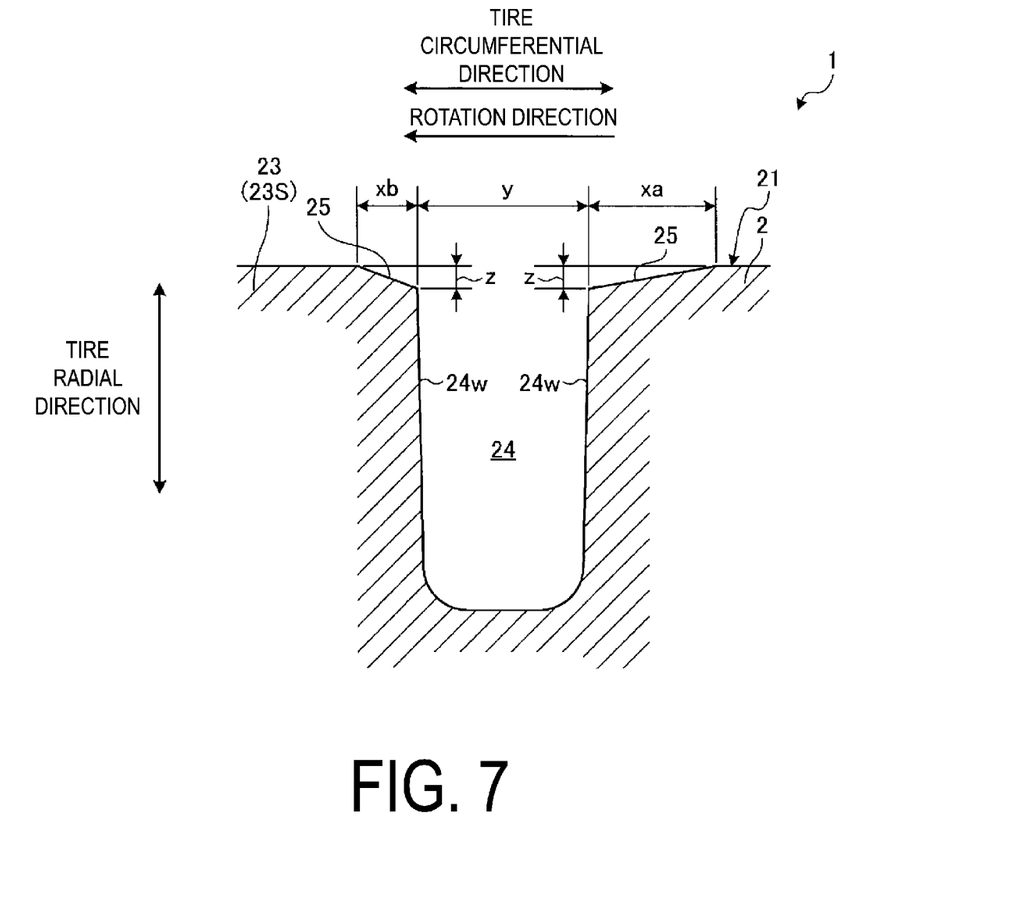
FIG. 7 is an enlarged cross-sectional view of a portion of a pneumatic tire according to another embodiment of the present technology.

FIG. 2 is an enlarged plan view of a portion of the pneumatic tire according to the present embodiment. FIG. 3 is an enlarged perspective view of a portion of the pneumatic tire according to the present embodiment. FIG. 4 is an enlarged perspective view of a portion of the pneumatic tire according to the present embodiment. FIG. 5 is an enlarged cross-sectional view of a portion of the pneumatic tire according to the present embodiment. FIG. 6 is an enlarged plan view of a portion of a pneumatic tire according to another embodiment. FIG. 7 is an enlarged cross-sectional view of a portion of a pneumatic tire according to another embodiment.

As illustrated in FIGS. 2 to 5, in the tread portion 2 of the pneumatic tire 1 of the present embodiment, the lug groove 24 is formed in the tread surface 21 of the shoulder land portion 23S, which is the land portion 23 located outermost in the tire lateral direction. The lug groove 24 of the shoulder land portion 23S terminates at a first end 24a side within the shoulder land portion 23S without communicating with the main groove 22 and passes through a ground contact edge T at a second end 24b side.

Here, "ground contact edge T" refers to the outermost edges of the ground contact region in the tire lateral direction. The ground contact region is the region where the tread surface 21 of the tread portion 2 of the pneumatic tire 1 comes into contact with a dry, flat road surface, when the pneumatic tire 1 is mounted on a regular rim, inflated to the regular internal pressure, and loaded with 70% of the regular load. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

In the shoulder land portion 23S, a notch portion 25 is formed on the opening edge of the lug groove 24. The notch portion 25 is a chamfer-like cutout inclined from the tread surface 21 cut inward in the tire radial direction that communicates with a groove wall 24w of the lug groove 24. Note that the notch portion 25 may be a planar chamfer inclined from the tread surface 21 inward in the tire radial direction or may be a curved surface. Note that in the drawings, the notch portion 25 is provided on both sides in the groove width direction of the lug groove 24 but is only required to be provided on at least one side.

The lug groove 24 of the shoulder land portion 23S has a groove width y that progressively decreases from the first end 24a side to the second end 24b side. In other words, in the lug groove 24 of the shoulder land portion 23S, the groove width y has a maximum groove width y0 at the first end 24a side located inward in the tire lateral direction, and the groove width y is the smallest at the second end 24b side located outward in the tire lateral direction. Thus, for the groove width y of the lug groove 24 of the shoulder land portion 23S, a ground contact edge width y1 at the ground contact edge T is less than the maximum groove width y0. Additionally, "groove width y of the lug groove 24" refers to the opening width between the groove walls 24w excluding the notch portions 25. As the groove width y increases/decreases, the interval between the groove walls 24w increases/decreases. The lug groove 24 of the shoulder land portion 23S has a cross-sectional area that progressively decreases from the first end 24a side to the second end 24b. The minimum groove width of the lug groove 24 of the shoulder land portion 23S is preferably 1.5 mm or greater in order to ensure drainage performance while suppressing noise emission, and the maximum groove width y0 is preferably 4.5 mm or less in order to suppress noise emission. Additionally, the groove depth (tire radial direction dimension from the groove bottom to the position of the groove opening at the tread surface) of the lug groove 24 of the shoulder land portion 23S is from 2.5 mm to 6.5 mm.

The position of the first end 24a, i.e., the termination position, of the lug groove 24 of the shoulder land portions 23S is located in a range Wa from the main groove 22 that is from 5% to 35% of a tire lateral direction dimension W from the main groove 22 located outermost in the tire lateral direction that defines the shoulder land portion 23S to the ground contact edge T. The position of the maximum groove width y0 of the lug groove 24 of the shoulder land portions 23S is located in a range Wb from the main groove 22 that is 40% or less of the tire lateral direction dimension W.

The notch portion 25 provided on the opening edge of the lug groove 24 of the shoulder land portion 23S has a notch width x that progressively increases from the first end 24a side to the second end 24b side of the lug groove 24. In other words, the notch width x of the notch portion 25 has a minimum notch width x0 on the inner side in the tire lateral direction, and the notch width x is at the maximum on the outer side in the tire lateral direction. Accordingly, for the notch width x of the notch portion 25, a ground contact edge notch width x1 at the ground contact edge T is greater than the minimum notch width x0. "Notch width x of the notch portion 25" refers to a chamfer width that is inclined from the tread surface 21 inward in the tire radial direction. The notch portion 25 has a cross-sectional area that progressively increases from the first end 24a side to the second end 24b of the lug groove 24 of the shoulder land portion 23S.

According to the pneumatic tire 1 configured as described above, the lug groove 24 terminates within the shoulder land portions 23S and is closed. Thus, the noise propagating from the main groove 22 located outermost in the tire lateral direction is prevented from emitting outward in the tire lateral direction through the lug groove 24, and the rigidity of the tread portion 2 at the shoulder land portion 23S is increased, allowing for a deterioration in steering stability performance and wear resistance performance to be prevented. Moreover, the lug groove 24 of the shoulder land portion 23S has the groove width y that gradually decreases toward the ground contact edge T. This allows the noise emitting outward from the lug groove 24 in the tire lateral direction to be suppressed. Moreover, the notch portion 25 provided on the opening edge of the lug groove 24 of the shoulder land portion 23S has the notch width x that gradually increases toward the ground contact edge T. This allows the drainage performance in the lug groove 24 to be increased. As a result, according to the pneumatic tire 1 of the present embodiment, pattern noise can be decreased and wet performance (braking performance on wet road surfaces) can be maintained.

Additionally, in the pneumatic tire 1 of the present embodiment, the relationships $0 \leq x0 < x$ and $0.2(y0-y)+x0 \leq x \leq 2.0(y0-y)+x0$ are preferably satisfied, where y0 is the maximum groove width of the lug groove 24 of the shoulder land portion 23S, x0 is the notch width of the notch portion 25 at the maximum groove width y0 position of the lug groove 24, y is the groove width of the lug groove 24 at a discretionary position located further outward in the tire lateral direction than the maximum groove width y0 position of the lug groove 24, and x is the notch width of the notch portion 25 at a discretionary position.

In the configuration illustrated in FIG. 6, $0=x0$ is true, with the notch width x0 of the notch portion 25 at the maximum groove width y0 position of the lug grooves 24 being 0, and the notch portion 25 expanding outward in the tire lateral direction starting from the maximum groove width y0 position of the lug groove 24.

According to the pneumatic tire 1, the notch width x of the notch portion 25 is set in accordance with the change in the groove width y of the lug groove 24 of the shoulder land portion 23S, and when the notch width x of the notch portion 25 is $0.2(y0-y)+x0$ or greater, an effect of improving drainage performance can be significantly obtained. When the notch width x of the notch portion 25 is $2.0(y0-y)+x0$ or less, the effect of suppressing noise emitting outward in the tire lateral direction from the lug groove 24 can be significantly obtained. As a result, pattern noise can be reduced and an effect of ensuring wet performance (braking performance on wet road surfaces) can be significantly obtained. Note that when the notch width x of the notch portion 25 exceeds $2.0(y0-y)+x0$, the ground contact region of the tread surface 21 of the shoulder land portion 23S decreases and the ground contact pressure increases. As a result, wear resistance performance tends to decrease. According to the pneumatic tire 1, this can be improved.

As illustrated in FIG. 5, in the pneumatic tire 1 of the present embodiment, a notch depth z of the notch portion 25 from the tread surface 21 inward in the tire radial direction is preferably from 0.5 mm to 3.0 mm.

According to this pneumatic tire 1, with the notch depth z of the notch portion 25 being 0.5 mm or greater, the effect of ensuring drainage performance can be significantly obtained. Also, with the notch depth z of the notch portion 25 being 3.0 mm or less, the effect of suppressing noise emission can be significantly obtained. Note that to better significantly obtain an effect of suppressing noise emission and ensuring drainage performance, the notch depth z of the notch portion 25 is more preferably from 0.5 mm to 1.5 mm.

As illustrated in FIG. 7, in the pneumatic tire 1 of the present embodiment, the rotation direction is designated, and the relationship xb<xa≤3.0xb is preferably satisfied, where xa is the notch width of the notch portion 25 located on the trailing side of the shoulder land portion 23S in the tire circumferential direction with respect to the lug groove 24, and xb is the notch width of the notch portion 25 located on the leading side.

Although not illustrated in the drawings, the designation of the rotation direction is indicated by an indicator (for example, an arrow that points in the rotation direction when the vehicle travels forward) provided on the sidewall portion 4 on the side surface of the tire located outward of the tread portion 2 in the tire lateral direction.

According to the pneumatic tire 1, with the notch width xa of the notch portion 25 on the trailing side of the shoulder land portion 23S in the tire circumferential direction with respect to the lug groove 24 being greater than the notch width xb of the notch portion 25 on the leading side, allows deformation (twisting) on the trailing side to be suppressed and rigidity ensured more than on the leading side with respect to the lug groove 24. As a result, heal and toe wear can be suppressed and wear resistance performance can be improved. In this case, the notch depth z of the notch portion 25 on the leading side and the trailing side is equal. Note that, although not illustrated in the drawings, the relationship xb<xa≤3.0xb being satisfied includes the notch portion 25 on the leading side not being provided.

Additionally, in the pneumatic tire 1 of the present embodiment, as illustrated in FIG. 2, the notch portion 25 preferably has a constant notch width x in the range from the position of the maximum groove width y0 of the lug groove 24 of the shoulder land portion 23S to the position at the terminating first end 24a.

According to the pneumatic tire 1, an amount of water taken in by the notch portion 25 is ensured in the range from the position of the maximum groove width y0 of the lug groove 24 of the shoulder land portion 23S to the position at the terminating first end 24a. Moreover, when the notch portion 25 is formed widening greatly toward the main groove 22 located outermost in the tire lateral direction, the ground contact region decreases at this portion and the ground contact pressure increases. As a result, wear resistance performance tends to decrease. According to the pneumatic tire 1, this can be improved.

Also, the pneumatic tire 1 according to the present embodiment has a designated vehicle inner/outer side orientation when mounted on a vehicle, and the shoulder land portion 23S provided with the lug grooves 24 and the notch portions 25 is preferably disposed at least on the vehicle outer side.

The designated vehicle inner/outer side orientation when the tire is mounted on a vehicle determines the orientation of the rim with respect to the vehicle inner side and the vehicle outer side in the tire lateral direction when, for example, the tire is mounted on a rim. Thus, the pneumatic tire 1, when mounted on a rim, has a designated vehicle inner/outer side orientation in the tire lateral direction when mounted on a vehicle. The pneumatic tire 1 includes a mounting direction indicator portion (not illustrated) that indicates the mounting direction with respect to a vehicle. The mounting direction indicator portion, for example, is constituted by a mark or ridges/grooves on the sidewall portion 4. For example, Economic Commission for Europe Regulation 30 (ECE R30) requires that a mounting direction indicator portion is provided on the sidewall portion 4 on the vehicle outer side when the tire is mounted on a vehicle.

The vehicle outer side when the tire is mounted on a vehicle has significant problems with noise emission. Thus, according to the pneumatic tire 1, by disposing the shoulder land portion 23S provided with the lug grooves 24 and the notch portions 25 of the present embodiment on the vehicle outer side, noise emission can be effectively suppressed and a significant effect can be obtained.

Additionally, in the pneumatic tire 1 of the present embodiment, preferably, at the position 0.50×L from the inner side in the tire lateral direction, a relationship 0.80×y0≤y≤0.98×y0 is satisfied; at the position 0.80×L from the inner side in the tire lateral direction, a relationship 0.60×y0≤y≤0.90×y0 is satisfied; and at the position 1.00×L from the inner side in the tire lateral direction, a relationship 0.30×y0≤y≤0.50×y0 is satisfied, where L is the tire lateral direction dimension from the position of the maximum groove width y0 of the lug groove 24 to the ground contact edge T, and y is the groove width of the lug groove at a discretionary position located further outward in the tire lateral direction than the position of the maximum groove width y0 of the lug groove 24.

According to the pneumatic tire 1, with the groove width y of the lug groove 24 at or near the ground contact edge T being narrow, groove volume can be ensured, wet performance can be maintained, and an effect of reducing pattern noise can be significantly obtained.

Examples

In the examples, performance tests for quietness performance (pattern noise) and wet performance (braking performance on wet road surfaces) were performed on a plurality of types of pneumatic tires of different conditions (see FIG. 8).

In the performance testing, pneumatic tires (test tires) having a tire size of 185/65R15 were mounted on a regular rim and inflated to the regular internal pressure. Then, the pneumatic tire was mounted on a test vehicle (a front wheel drive vehicle having an engine displacement of 1200 cc).

In the evaluation method for quietness performance, cabin noise (dB) was measured when the test vehicle drove on an ISO (International Standards Organization)-specified road surface of a test course at a speed of 50 km/h. The measurement values were expressed as index values and evaluated, with the Conventional Example being assigned as the reference value (100). In the evaluation, larger values indicate less cabin noise (pattern noise) and excellent quietness performance.

In the evaluation method for wet performance, the distance the test vehicle took to stop on a wet road surface with a water depth of 1 mm after engaging the brakes at an initial speed of 100 km/h was measured. The reciprocals of the measurement values were taken and expressed as index values and evaluated, with the Conventional Example being assigned as the reference value (100). In the evaluation, larger values indicate excellent wet performance.

As indicated in FIG. 8, the pneumatic tires of the Conventional Example, Comparative Example, and Examples 1 to Example 7 include a shoulder land portion provided with a lug groove that terminates at a first end and meets a ground contact edge at a second end and a notch portion on the opening edge of the lug groove. The notch portion has a constant notch width in the range from a maximum groove width position of the lug groove to a terminating end position. In the pneumatic tire of the Conventional Example, the groove width of the lug groove and the notch width of the notch portion do not change. In the pneumatic tire of the Comparative Example, the groove width of the lug groove increases toward the ground contact edge, and the notch width of the notch portion does not change. In the pneumatic tires of Examples 1 to 7, the groove width of the lug groove decreases toward the ground contact edge, and the notch width of the notch portion increases toward the ground contact edge.

As can be seen from the test results in FIG. 8, the pneumatic tires of Examples 1 to 7 have enhanced pattern noise and wet performance can be maintained.

The invention claimed is:

1. A pneumatic tire, comprising:
   in a tread surface of a shoulder portion, a main groove extending in a tire circumferential direction;
   a shoulder land portion defined by an outermost side in a tire lateral direction of the main groove;
   lug grooves arranged in the tire circumferential direction in the tread surface of the shoulder land portion, the lug grooves each crossing the tire circumferential direction and terminating at a first end side within the shoulder land portion and passing through a ground contact edge at a second end side; and
   a notch portion formed on an opening edge of the lug grooves, the notch portions being a cutout from the tread surface cut inward in a tire radial direction;
   the lug grooves having a groove width that decreases from the first end side to the second end side, a terminating end position of the lug grooves being disposed in a range from the main groove that is from 5% to 35% of a tire lateral direction dimension from the main groove to the ground contact edge, and a maximum groove width position being disposed in a range from the main groove that is 40% or less of the tire lateral direction dimension from the main groove to the ground contact edge; and
   the notch portion having a notch width that increases from the first end side to the second end side of the lug grooves; wherein
   at a position $0.50 \times L$ from an inner side in the tire lateral direction, a relationship $0.80 \times y0 \leq y \leq 0.98 \times y0$ is satisfied;
   at a position $0.80 \times L$ from the inner side in the tire lateral direction, a relationship $0.60 \times y0 \leq y \leq 0.90 \times y0$ is satisfied; and
   at a position $1.00 \times L$ from the inner side in the tire lateral direction, a relationship $0.30 \times y0 \leq y \leq 0.50 \times y0$ is satisfied, where L is a tire lateral direction dimension from the maximum groove width position of the lug grooves to the ground contact edge, y0 is a maximum groove width of the lug grooves, and y is a groove width of the lug grooves at a discretionary position located further outward in the tire lateral direction than the maximum groove width position of the lug grooves.

2. The pneumatic tire according to claim 1, wherein relationships $0 \leq x0 < x$ and $0.2(y0-y)+x0 \leq x \leq 2.0(y0-y)+x0$ are satisfied, where y0 is a maximum groove width of the lug grooves, x0 is the notch width of the notch portion at the maximum groove width position of the lug grooves, y is a groove width of the lug grooves at a discretionary position located further outward in the tire lateral direction than the maximum groove width position of the lug grooves, and x is a notch width of the notch portion at a discretionary position.

3. The pneumatic tire according to claim 1, wherein the notch portion has a notch depth from the tread surface inward in the tire radial direction of from 0.5 mm to 3.0 mm.

4. The pneumatic tire according to claim 1, wherein
   a rotation direction is designated; and
   a relationship $xb < xa \leq 3.0xb$ is satisfied, where xa is a notch width of the notch portion located on a trailing side of the shoulder land portion in the tire circumferential direction with respect to the lug grooves, and xb is a notch width of the notch portion located on a leading side.

5. The pneumatic tire according to claim 1, wherein the notch portion has a constant notch width in a range from the maximum groove width position of the lug grooves to the terminating end position.

6. The pneumatic tire according to claim 1, wherein
   a vehicle inner/outer side orientation when mounted on a vehicle is designated; and
   the shoulder land portion provided with the lug grooves and the notch portion is disposed at least on a vehicle outer side.

7. The pneumatic tire according to claim 2, wherein the notch portion has a notch depth from the tread surface inward in the tire radial direction of from 0.5 mm to 3.0 mm.

8. The pneumatic tire according to claim 7, wherein
   a rotation direction is designated; and
   a relationship $xb < xa \leq 3.0xb$ is satisfied, where xa is a notch width of the notch portion located on a trailing side of the shoulder land portion in the tire circumferential direction with respect to the lug grooves, and xb is a notch width of the notch portion located on a leading side.

9. The pneumatic tire according to claim 8, wherein the notch portion has a constant notch width in a range from the maximum groove width position of the lug grooves to the terminating end position.

10. The pneumatic tire according to claim 9, wherein
    a vehicle inner/outer side orientation when mounted on a vehicle is designated; and
    the shoulder land portion provided with the lug grooves and the notch portion is disposed at least on a vehicle outer side.

11. A pneumatic tire, comprising:
    in a tread surface of a shoulder portion, a main groove extending in a tire circumferential direction;
    a shoulder land portion defined by an outermost side in a tire lateral direction of the main groove;
    lug grooves arranged in the tire circumferential direction in the tread surface of the shoulder land portion, the lug grooves each crossing the tire circumferential direction and terminating at a first end side within the shoulder land portion and passing through a ground contact edge at a second end side; and
    a notch portion formed on an opening edge of the lug grooves, the notch portions being a cutout from the tread surface cut inward in a tire radial direction;
    the lug grooves having a groove width that decreases from the first end side to the second end side, a terminating end position of the lug grooves being disposed in a range from the main groove that is from 5% to 35% of a tire lateral direction dimension from the main groove to the ground contact edge, and a maximum groove width position being disposed in a range from the main groove that is 40% or less of the tire lateral direction dimension from the main groove to the ground contact edge; and the notch portion having a notch width that increases from the first end side to the second end side of the lug grooves; wherein relationships $0 \leq x0 < x$ and $0.2(y0-y)+x0 \leq x \leq 2.0(y0-y)+x0$ are satisfied, where $y0$ is a maximum groove width of the lug grooves, $x0$ is the notch width of the notch portion at the maximum groove width position of the lug grooves, $y$ is a groove width of the lug grooves at a discretionary position located further outward in the tire lateral direction than the maximum groove width position of the lug grooves, and $x$ is a notch width of the notch portion at a discretionary position; and the notch portion has a notch depth from the tread surface inward in the tire radial direction of from 0.5 mm to 3.0 mm.

* * * * *